Patented June 9, 1953

2,641,548

UNITED STATES PATENT OFFICE 2,641,548

METHOD OF PRESERVING AVOCADOS

Helen W. Heinrich, Little Rock, Calif.

No Drawing. Application April 6, 1950,
Serial No. 154,440

4 Claims. (Cl. 99—154)

This invention relates to a method of preserving avocados, and the product resulting therefrom. The application is a continuation-in-part of my prior application Serial No. 116,627, filed September 19, 1949, entitled Method of Preserving Avocados.

A primary object of the invention is to provide a method by which the meat of an avocado fruit may be preserved for future use wherein the product obtained from the use of the method retains the flavor and other characteristics of the fresh fruit.

More specifically, an object of the invention is to provide a method of preserving avocado meat which can be optionally used to preserve the meat for a period of from four to six months without canning it in hermetically sealed containers, or which can be used to can the meat in such containers so as to be preserved indefinitely.

In districts where avocados are raised many attempts have been made to preserve the meat of this fruit. Climatic conditions frequently are such that the entire crop will ripen very quickly and while the ripening of the fruit after it has been picked can be somewhat postponed or delayed by packing each fruit separately and maintaining it in a cool dark place, nevertheless the ripening proceeds rather rapidly. It is consequently highly desirable to be able to allow the fruit to ripen normally and to be able to preserve the meat of the fruit for future use. Heretofore attempts have been made to preserve avocado meat but such attempts have generally proven unsuccessful due to the fact that the resulting product has a decidedly different flavor from that of the fresh avocado.

Essentially, the present method consists of blanching or scalding the fresh avocado meat in an edible vegetable oil for approximately one minute at a temperature of approximately 220° F. although temperatures below and above this preferred temperature may be employed as hereinafter explained.

In preserving the avocado meat in the form of an avocado butter such as is used as a spread, the fruit is peeled and the seed or pit removed. The meat is mashed into the form of a paste. This mashed meat is then quickly introduced into an edible vegetable oil that has been heated to a temperature of approximately 220° F. and is rapidly stirred therein for a period of about one minute. I prefer to use a vegetable oil which, if it has a flavor, is compatible with that of the flavor of the avocado meat. Many vegetable oils for all practical purposes may be regarded as substantially flavorless. After the meat has been thus treated it is removed and placed in a suitable storage container and can be stored from four to six months if maintained at a relatively cool temperature which will greatly retard, if not prevent, the oil from turning rancid. This form of product can be kept in an open container, that is one which has not been hermetically sealed, in a refrigerator or cooler or can even be frozen.

In preserving quarters or diced pieces of the avocado meat these pieces are immersed in the edible vegetable oil, heated to a temperature of about 220° F. for approximately one minute. Thereafter, they may be removed and placed in jars and covered with the oil and similarly kept.

In my prior application above referred to I was of the belief that corn oil was the only suitable oil for my purpose. Further experimentation, however, has disclosed that the temperature of the blanching oil need not be as high as 220° F. but may be as low as 185° F. Temperatures above 220° F. may be used if the avocado meat is agitated or stirred sufficiently to prevent scorching. In view of the fact that this range of temperatures is permissible, I find it is possible to use any edible vegetable oil which is either flavorless or which has a flavor compatible with that of the avocado and which will not break down or darken objectionably when heated to the blanching temperature of 185° F. or above. Corn oil is quite suitable, but in addition thereto, cottonseed oil which has been freshly refined is also suitable. Soy bean oil can be employed at a relatively low blanching temperature but at high temperatures such as 220° F. soy bean oil has a tendency to break down and darken objectionably. Even avocado oil may be employed.

In my prior application, above-mentioned, Wesson oil which is primarily cottonseed oil and peanut oil were mentioned as being objectionable due to their rapidly turning rancid. I find however that many cottonseed oils placed on the market have been allowed to remain stored in their containers for long periods of time before being used. These cooking oils marketed as such frequently contain small amounts of antioxidants or oxidizing inhibitors designed to retard or prevent the oil from turning rancid during prolonged periods of storage. Nevertheless, although such vegetable oils are thus equipped with the oxidation inhibitors they approach turning rancid in their containers during storage so that at the time of use they may be in such condition that on being used in my process they may turn rancid rapidly thereafter.

In my process, if such oils as cottonseed and peanut oil are freshly prepared they may be used to advantage with or without an anti-oxidant or oxidation inhibitor. I find also that some olive oils are obtainable which have been so refined as to be almost flavorless and these oils may be used without imparting an objectionable flavor to the avocado meat. The proportion of oil used to the avocado meat is not critical, being in the neighborhood of one part oil to three parts of avocado meat, or one part oil to four parts meat. These proportions may vary considerably.

In performing my process I find it advantageous to add to the oil an anti-oxidant or oxidation inhibitor that will not only retard rancidity in the edible vegetable oil used, but will also retard the avocado oil inherently present in the avocado meat from oxidizing or turning rancid. Even if the oil employed is a commercial product containing an anti-oxidant or oxidation inhibitor it is desirable in most instances, but not invariably so, to add an anti-oxidant or oxidation inhibitor. This added inhibitor is effective upon the avocado oil inherently present in the avocado meat. Some oxidation inhibitors that have been successfully employed are (1) Nordihydroguaiaretic acid, a recommended proportion of which is approximately .005%.
(2) Butylated hydroxyanisole, a recommended proportion being .01% to .02% by weight.
(3) "Sustane," a highly purified grade of tertiary butyl hydroxyanisole which is mixture of two isomers with 3-tertiary butyl 4-hydroxyanisole, the more potent isomer predominating.

This product is furnished in three forms
 (a) as a crystal and solid in which the recommended proportion is about .01%.
 (b) In a 30% solution in lard oil in which case I use a recommended proportion of about 1 pound to three thousand pounds of my product.
 (c) In a solution of propyl gallate having approximately the following composition:

| | Per cent |
|---|---|
| Butyl hydroxyanisole | 20 |
| Propyl gallate | 6 |
| Citric acid | 4 |
| Propylene glycol | 70 |

The recommended proportion of this inhibitor is about one pound to two thousand pounds of my product.
 (d) The anti-oxidant disclosed in U. S. Letters Patent No. 2,464,927. Of this anti-oxidant, two ounces to four ounces is used per one hundred pounds of my product.

Other oxidation inhibitors may be employed in lieu of those mentioned which will prevent or retard the vegetable oil used and/or the avocado oil inherently present in the meat from rapidly turning rancid.

I find it is relatively important to heat the avocado meat as fast as is reasonably possible to a point above 180° F. in order to prevent the avocado meat from acquiring a bitter flavor. This is particularly true if the product is to be subsequently canned in hermetically sealed containers which, in accordance with some State laws such as that of California, require that the product be heated in the container for eighty minutes at a temperature of 240° F. The acquisition of the bitter flavor is apparently caused by the action of enzymes present in the avocado meat, this action being favored through the relatively low pH factor of the avocado. With the rise of temperature the action of these enzymes is apparently greatly increased or speeded but as the temperature passes 140° F. these enzymes either become inactivated or their effect is reduced to a minimum. Consequently, it is highly desirable to raise the temperature of the avocado meat as rapidly as reasonably possible in order that the time during which conditions are most favorable to the enzymes may be reduced to a minimum. For this reason, it is frequently desirable to pass the avocado mash into the hot oil in the form of thin layers so that the meat composing the layer can be quickly brought up to the temperature of the blanching oil.

It is of some importance to employ the proper type of container in which the blanching or scalding takes place. I have found that stainless steel of the character conventionally employed for cooking vessels is suitable. Vessels of glass, porcelain, or granite ware may be employed. The stirring and handling of the avocado meat is preferably accomplished with a wooden spoon. I find that if the container in which the blanching or scalding takes place is made of aluminum or if the stirring implement is made of aluminum that this metal seems to impart a disagreeable metallic flavor to the avocado meat. The use of copper vessels or copper implements is to be avoided as this metal will detrimentally affect the color of the meat by turning it dark.

The containers in which the treated meat is kept should likewise be either of stainless steel or of a non-metallic character such as glass, porcelain, or the like. Cans that have been internally treated so as to be suitable for canning fruits however can be employed.

A feature of the present process is that the blanching or scalding operation with the vegetable oil seem to return to the meat its desirable bright green color. If the avocado meat used is somewhat yellowish in its natural state, as frequently occurs when the fruit is slightly overripe, the blanching seems to restore to the meat its bright green color.

The delicate flavor of the avocado meat may be accentuated or intensified by the addition of a small amount of flavor accentuator such as mono-sodium glutamate.

The avocado meat thus blanched or scalded may be kept for a period of four to six months in an open container in a cooler or refrigerator. However, when it is desired to preserve the meat for an indefinite length of time the product may be placed in containers and hermetically sealed therein, such as by heat-sealing as in home canning. For canning plant production the meat may be placed in suitable containers and heated in a pressure cooker for the required time of eighty minutes at 240° F. This procedure, however, tends to lighten the color of the product.

Instead of hermetically sealing the blanched avocado meat in cans or similar receptacles, the product may be kept indefinitely also by freezing it in any of the conventional manners wherein deep frozen foods are preserved.

It will be found that the resulting product has a flavor, as well as other characteristics very close to that of the fresh fruit, particularly if the blanching oil is either flavorless or has a flavor compatible with that of the avocado oil.

Various changes may be made in the method or procedure herein disclosed within the scope of the invention as defined by the appended claims.

I claim:

1. The method of preserving avocado meat which includes blanching the meat in an edible vegetable oil for about one minute at a temperature of from 185° F. to 220° F.

2. The method of preserving avocado meat which includes introducing the meat into an edible vegetable oil and rapidly bringing the temperature of the meat to a temperature of from 185° F. to 220° F. and maintaining it at such temperature for about one minute.

3. The method of preserving avocado meat which consists of blanching the meat in an edible vegetable oil to which a small amount of oxidation inhibitor has been added for about one minute at a temperature of between 185° F. and 220° F.

4. The method of preserving avocado meat which consists of blanching the meat in an edible vegetable oil to which a small amount of oxidation inhibitor has been added for about one minute at a temperature of between 185° F. and 220° F., then placing the meat and oil in hermetically sealed containers and cooking at 240° F. for eighty minutes.

HELEN W. HEINRICH.

References Cited in the file of this patent

UNITED STATES PATENTS

| Number | Name | Date |
| --- | --- | --- |
| 769,737 | Gardner | Sept. 13, 1904 |
| 1,377,088 | Martin | May 3, 1921 |
| 2,315,858 | Johnston et al. | Apr. 6, 1943 |
| 2,485,635 | Neal | Oct. 25, 1949 |